(12) United States Patent
Chan et al.

(10) Patent No.: US 7,545,954 B2
(45) Date of Patent: Jun. 9, 2009

(54) SYSTEM FOR RECOGNIZING EVENTS

(75) Inventors: Michael Chan, Niskayuna, NY (US);
Anthony Hoogs, Niskayuna, NY (US);
John Schmiederer, Ballston Spa, NY (US)

(73) Assignee: General Electric Company, Niskayuna, NY (US)

( * ) Notice: Subject to any disclaimer, the term of this patent is extended or adjusted under 35 U.S.C. 154(b) by 651 days.

(21) Appl. No.: 11/208,792

(22) Filed: Aug. 22, 2005

(65) Prior Publication Data

US 2007/0041615 A1 Feb. 22, 2007

(51) Int. Cl.
G06K 9/00 (2006.01)
A63F 13/00 (2006.01)

(52) U.S. Cl. .................. 382/103; 382/170; 382/181; 463/4

(58) Field of Classification Search ........ 382/103, 382/107, 115, 118, 170, 181, 224; 348/169, 348/699, 402.1, 413.1; 375/240.08; 715/700, 715/716; 706/55; 463/1, 4, 10
See application file for complete search history.

(56) References Cited

U.S. PATENT DOCUMENTS

| 6,072,542 | A | 6/2000 | Wilcox et al. |
|---|---|---|---|
| 6,404,925 | B1 | 6/2002 | Foote et al. |
| 6,574,354 | B2 * | 6/2003 | Abdel-Mottaleb et al. .. 382/118 |
| 6,616,529 | B1 | 9/2003 | Qian et al. |
| 6,678,413 | B1 * | 1/2004 | Liang et al. ................. 382/181 |
| 6,751,354 | B2 | 6/2004 | Foote et al. |
| 6,754,389 | B1 * | 6/2004 | Dimitrova et al. ........... 382/224 |
| 6,763,069 | B1 | 7/2004 | Divakaran et al. |
| 6,774,917 | B1 | 8/2004 | Foote et al. |
| 2002/0028021 | A1 | 3/2002 | Foote et al. |
| 2002/0138458 | A1 | 9/2002 | Siskind |
| 2004/0017389 | A1 | 1/2004 | Pan et al. |
| 2004/0120554 | A1 | 6/2004 | Lin et al. |
| 2004/0120581 | A1 | 6/2004 | Ozer et al. |
| 2004/0125877 | A1 | 7/2004 | Chang et al. |
| 2004/0143434 | A1 | 7/2004 | Divakaran et al. |
| 2004/0186718 | A1 | 9/2004 | Nefian et al. |

* cited by examiner

Primary Examiner—Abolfazl Tabatabai
(74) Attorney, Agent, or Firm—Jason K. Klindtworth

(57) ABSTRACT

A system recognizes events. The system includes a sequence of continuous vectors and a sequence of binarized vectors. The sequence of continuous vectors represents spatial-dynamic relationships of objects in a predetermined recognition area. The sequence of binarized vectors is derived from the sequence of continuous vectors by utilizing thresholds for determining binary values for each spatial-dynamic relationship. The sequence of binarized vectors indicates whether an event has occurred.

19 Claims, 4 Drawing Sheets

SYSTEM FOR RECOGNIZING EVENTS

FIELD OF INVENTION

The present invention relates to a system for recognizing events and, more specifically, to a system for recognizing video events with semantic primitives using a probabilistic state-space model, such as a Hidden Markov Model.

BACKGROUND OF THE INVENTION

A conventional video recognition system automatically detects (in software) an occurrence of a particular event of interest in a large corpus of video data. The events may happen infrequently, over a short period of time, and may comprise a small fraction of the corpus of video data.

Each event may vary in appearance and dynamic characteristics causing recognition failures. Also, failure of recognition may be caused by changes in relative position, speed, size, etc. of objects involved in the event. There are two conventional approaches addressing these types of failures: a rule-based method and a probabilistic method.

The rule-based method relies on direct models of events and cannot easily incorporate uncertainty reasoning. This results in a lack of robustness over variation in appearance and dynamic characteristics.

The probabilistic method performs uncertainty reasoning, but event models must be learned from training examples. This typically requires many training examples, covering a large range of variability, to establish parameters of the model. Often this training data is not available, particularly for the unusual events that are typically of most interest.

A user may create an event model for an event of interest by specifying objects involved in the event, roles of those objects, semantic spatial-dynamic relations between the objects, and temporal constraints of the interaction between objects. The spatial relations may be encoded in a binarized vector representation. The temporal constraints and uncertainty may be expressed using a Hidden Markov Model (HMM) framework.

A Hidden Markov Model is a doubly stochastic process consisting of a state transition model, $\{a_{ij}: 1 \leq i,j \leq N\}$ where N is the number of states, and a set of observation probability density functions (pdfs). In recognition, the objective is to recover the most likely sequence of hidden states, given a sequence of feature observations $\{o_t: 1 < t < T\}$. The observation densities $b_j(o)$, which depend on the state j the process is in at time t, can be continuous or discrete.

This representation may decouple the underlying states of interest and the observation models, allowing uncertainty and variation to be incorporated. A left-right HMM for representing the temporal constraints in time-series data, as in the case of video data, may be used.

Typical applications of HMMs for recognition involve modeling the trajectories of some observable objects, often using Gaussian distributions or mixtures of Gaussian distributions. Given enough examples of each category to be recognized, parameters of the HMM may be learned, such as very detailed distributions of temporal trajectories. However, it may be difficult for a model to process unseen data without adequate training data.

Furthermore, an optimal number of states is typically experimentally learned. Semantic meanings may be difficult to attach to the states after this experimental learning.

SUMMARY OF THE INVENTION

An example system in accordance with the present invention recognizes events. The system includes a sequence of continuous vectors and a sequence of binarized vectors. The sequence of continuous vectors represents spatial-dynamic relationships of objects in a predetermined recognition area. The sequence of binarized vectors is derived from the sequence of continuous vectors by utilizing thresholds for determining binary values for each spatial-dynamic relationship. The sequence of binarized vectors indicates whether an event has occurred.

An example computer program product in accordance with the present invention recognizes events. The computer program product includes: a first instruction for representing objects and spatial-dynamic relationships of the objects by a continuous vector; a second instruction for representing the spatial-dynamic relationships of objects with semantic primitive features; a third instruction for converting the continuous vector to a binarized vector; a fourth instruction for utilizing thresholds for determining binary values for each semantic primitive feature; a fifth instruction for representing uncertainty of measurements of the semantic primitive features estimated from a video signal with probability density functions; a sixth instruction for representing events with a state-space model; a seventh instruction for representing observation densities with the probability density functions; and an eighth instruction for determining whether an event has occurred based on a sequence of semantic primitive features of the video signal.

Another example system in accordance with the present invention recognizes events occurring between objects within a predetermined video recognition area. The system includes a sequence of continuous vectors and a sequence of binarized vectors. The sequence of continuous vectors represents spatial-dynamic relationships between the objects in the predetermined video recognition area. The sequence of binarized vectors represents the sequence of continuous vectors by utilizing thresholds for determining binary values for each spatial-dynamic relationship. The sequence of binarized vectors indicates whether an event has occurred.

BRIEF DESCRIPTION OF THE DRAWINGS

The foregoing and other features of the present invention will become apparent to one skilled in the art to which the present invention relates upon consideration of the following description of the invention with reference to the accompanying drawings, wherein.

DESCRIPTION OF AN EXAMPLE EMBODIMENT

Objects and spatio-temporal dynamics of an event model are naturally dependent on a domain, to a certain degree. For example, in recognizing physical loading/unloading activities, relevant concepts may include an object to be transported, an instrument of conveyance, a source location, and a destination location.

Figure 2:
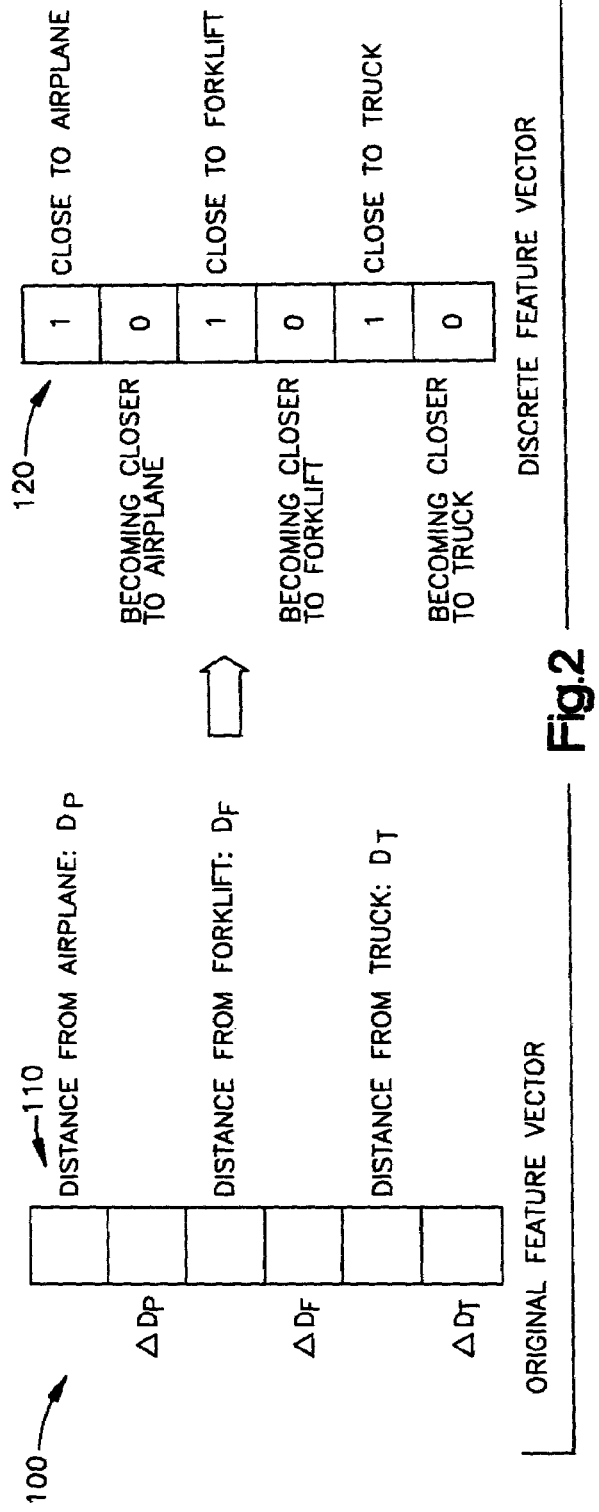
FIG. 2 is a schematic representation of example semantic primitive observation generation by the system of FIG. 1.

A system in accordance with the present invention may use semantic primitives to obtain generality beyond the training data, and some degree of domain independence. An example is illustrated in FIG. 2. The example event of interest is the transfer of cargo; in this instance, from an airplane to a nearby truck, via a forklift. On the left of FIG. 2 is an observed, continuous feature vector, which may capture distance from designated objects to a cargo container. On the right of FIG. 2, distances have been binarized by thresholding, to represent semantic information that represents, beyond a predetermined distance, cargo is no longer "close" to another object. Once the predetermined distance is exceeded, an exact value of the distance becomes irrelevant. Semantic relations related to relative speed (i.e., dynamics, etc.) may be similarly incorporated.

Thus, little training data is required for the system. Rare events may be recognized despite significant variation in appearance and dynamics. Also, event models may be created by users, using intuitive, human-level semantic primitives.

Figure 3:
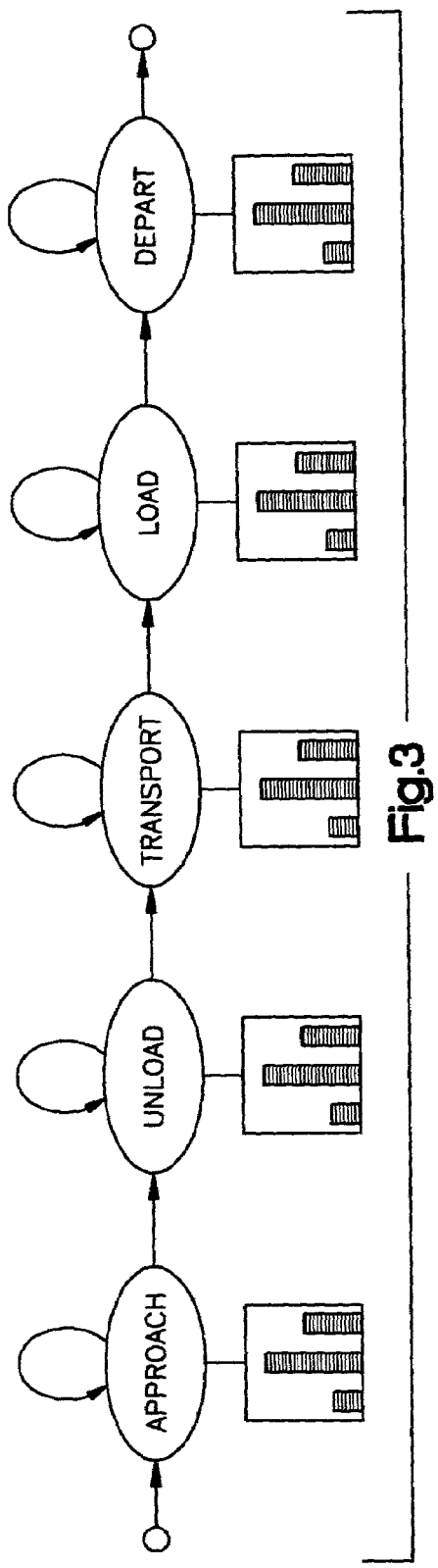
FIG. 3 is a schematic representation of an example cycle for use with the system of FIG. 1.

FIG. 3 shows an example HMM composed of five states that model a complete unload and load cycle. Other state compositions may be created to model partial activity cycles as well. By using these semantic primitives in an HMM, the system may leverage the natural ability of left-right HMMs to enforce temporal constraints and perform recognition.

In generating binarized features, the system may set thresholds for a closeness relation. The system may globally set thresholds based on physical sizes of objects and other calibration information. Image noise may create some uncertainty with respect to the thresholds. The system may overcome this uncertainty by including a finite probability of noisy observations at the threshold boundary in the discrete observation pdf for each state.

The system may estimate these pdfs using multiple binarized observation series generated from original training data at a range of suitable thresholds, or using some supplemental training data that may be generated to simulate the effects of thresholding in the feature space of the HMM model. The system may concurrently estimate the transition probabilities and observation pdfs of the HMMs.

As stated above, the system automatically recognizes events in a video image. The system uses Hidden Markov Models (HMMs) to represent spatio-temporal relations between objects, where the data observables are semantic spatial primitives encoded in binary feature vectors.

The system may observe an event as a sequence of binarized distance relations among objects participating in the event. This avoids modeling the specific temporal trajectories of the distances involved, and thereby greatly reduces an amount of training data required. This also enables generalization to other video scenes where little or no training data may be available.

A user may create a model for an event of interest by specifying objects involved in the event, their roles, and their semantic spatial and temporal relations. As few as one training example (video showing the event) may also be provided. The model provides quantitative constraints, which are used to create a binary feature vector from the observed inter-object distances. The system computes the feature vector on the training example(s) and sets parameters of the HMM using HMM updating techniques.

For recognition, all objects in a video image may be tracked. All n-tuples of objects may be considered as candidate objects for a given event model with n participants. From the tracking, the system may compute distances and a binary feature vector on each video frame.

The sequence of distance measurements and binary feature vectors may be input to the HMM, which outputs a log-likelihood of the overall event using HMM evaluation techniques. The system recognizes the event when the average log-likelihood exceeds a predetermined threshold.

Because the system creates events using semantic primitives that are invariant to various appearance changes, only a very small number of training examples are required by the system. The system thereby enables robust recognition of rare or unusual events across video images that may be very different from a training set. Conventional approaches require a training set that spans the space of appearance variability, which may be very large and cumbersome.

The system may efficiently match observed objects to event model objects. For example, an event may involve N objects. When M>=N objects are observed, some subset of the M objects are assigned to the N possible objects. Evaluating all possibilities is computationally expensive. The system uses semantic constraints, derived from the model, to quickly eliminate most of the possible assignment possibilities.

To address the added complexity created by a moving visual sensor, the system may improve video-based sensor motion compensation by using a color mask to constrain visual feature extraction on a ground plane of a 3D scene. By using a scene model, the system may extract 3D tracks from images that may improve robustness of the system over viewpoint variation.

As stated above, the system requires very little training data so that rare events may be recognized despite significant variation in appearance and dynamics. Also, operators of the system may create event models using intuitive, human-level semantic primitives.

As shown in FIG. 2, an example subsystem 100 of the system 10 in accordance with the present invention produces semantic primitive observation. The subsystem 100 may include a sequence of continuous vectors 110 and a sequence of binarized vectors 120. The sequence of continuous vectors 110 represents spatial-dynamic relationships of objects in a predetermined recognition area. The sequence of binarized vectors 120 is derived from the sequence of continuous vectors 110 by utilizing thresholds for determining binary values for each semantic primitive feature. The sequence of binarized vectors 120 determines whether an event has occurred.

As illustrated in the example system of FIG. 2, the vent of interest is the transfer of cargo from an airplane to a nearby truck, by a forklift. On the left is the observed, continuous feature vector, which is the distance from the designated object to the cargo container. On the right, the distances have been binarized by thresholding, to represent the semantic information that, beyond a predetermined distance, the cargo is no longer "close" to the other object. Once the distance threshold is exceeded, the exact value of the distance becomes irrelevant. Dynamic relationships (e.g., relative speed) may also be incorporated.

Figure 4:
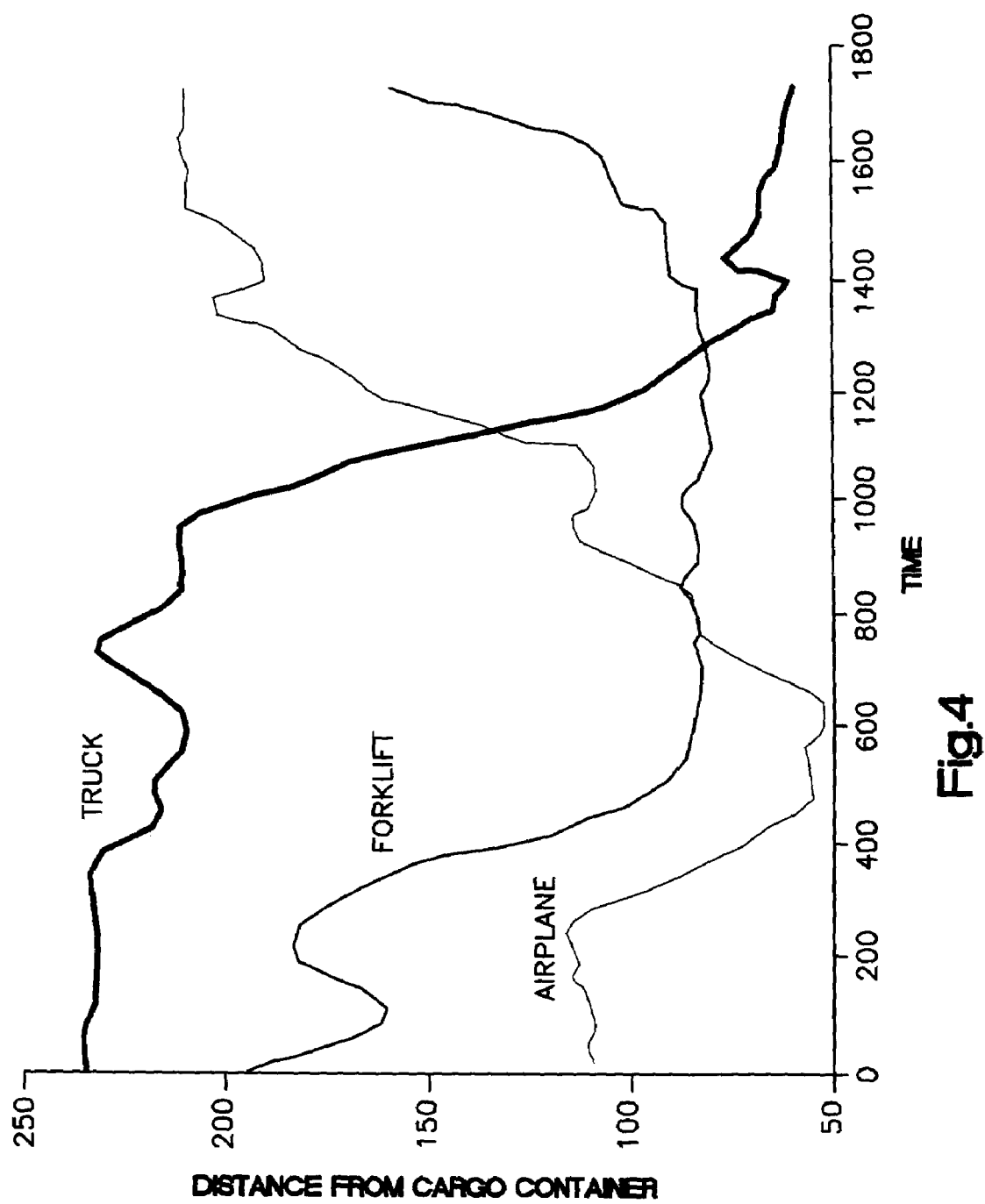
FIG. 4 is a schematic representation of example data generated by the system of FIG. 1.

For an example video, the measured distances are shown in FIG. 4. A threshold value defines an exact meaning of "close", a semantic concept that indicates a binary spatial relationship between two objects.

Figure 1:
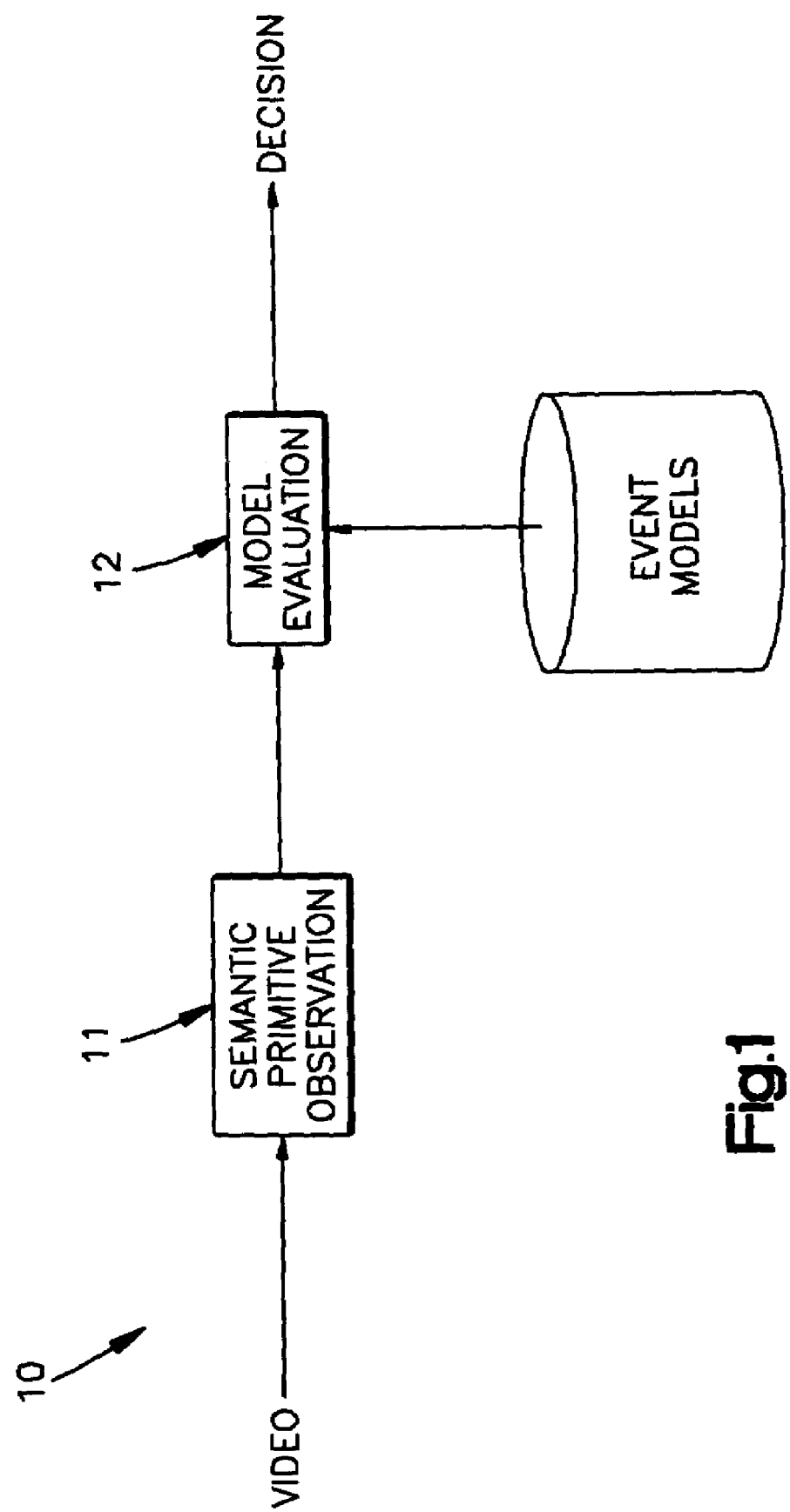
FIG. 1 is a schematic representation of an example system in accordance with the present invention.

A shown in FIG. 1, another example system 10 in accordance with the present invention recognizes events. The system 10 may include a process for converting a video signal to a sequence of semantically meaningful primitive measurements. This process may be executed by the converter 11. The converter 11 may track objects in the video signal. A model evaluator 12 may evaluate the tracked objects. The evaluator 12 may utilize event models stored a database. The model evaluator 12 may determine whether an event has occurred with a predetermined recognition area.

Figure 5:
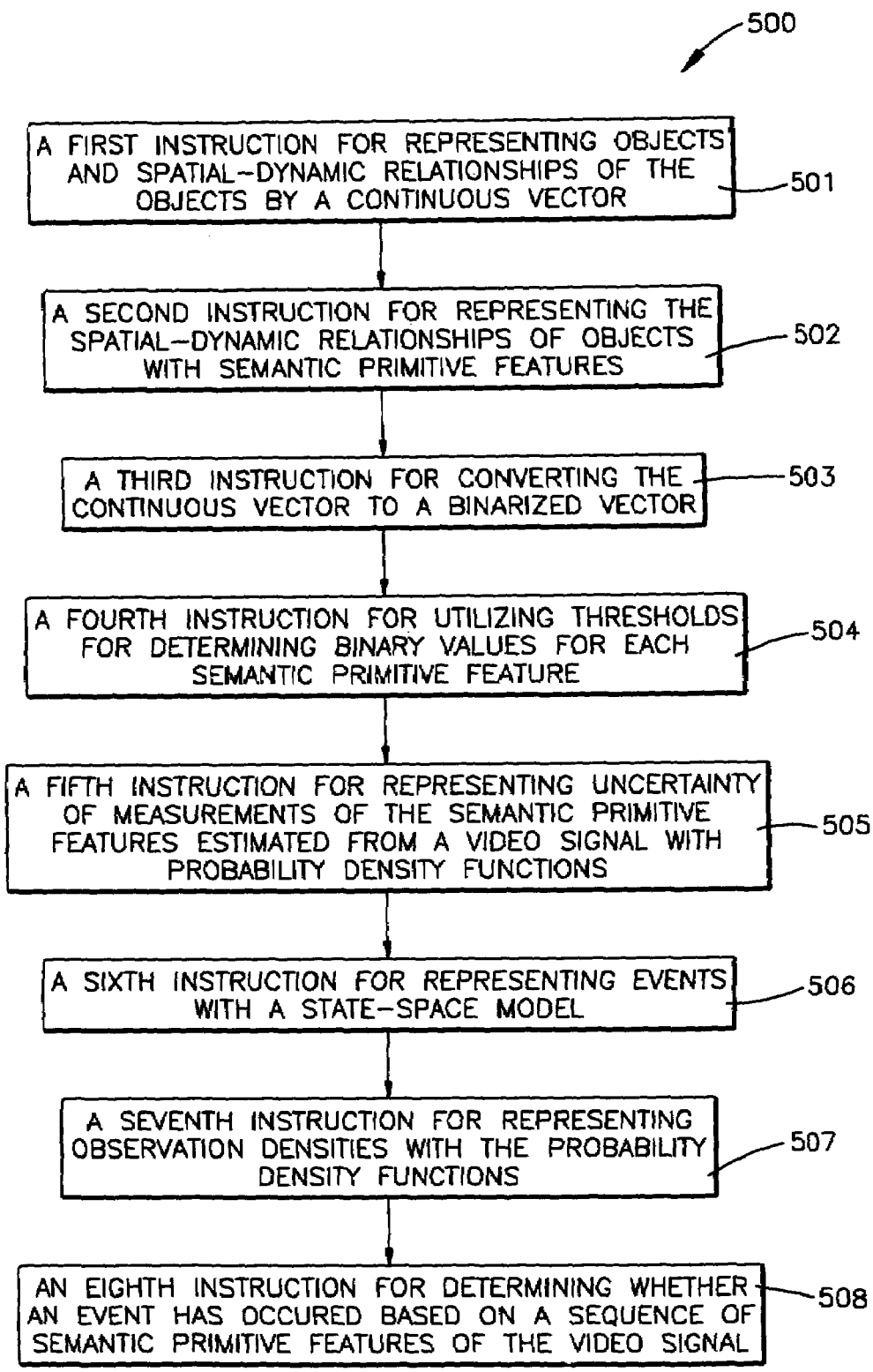
FIG. 5 is a schematic representation of an example computer program product in accordance with the present invention.

As shown in FIG. 5, an example computer program product 500 in accordance with the present invention recognizes events. The computer program product 500 may include: a first instruction 501 for representing objects and spatial-dynamic relationships of the objects by a continuous vector; a second instruction 502 for representing the spatial-dynamic relationships of objects with semantic primitive features; a third instruction 503 for converting the continuous vector to a binarized vector; a fourth instruction 504 for utilizing thresholds for determining binary values for each semantic primitive feature; a fifth instruction 505 for representing uncertainty of measurements of the semantic primitive features estimated from a video signal with probability density functions; a sixth instruction 506 for representing events with a state-space model; a seventh instruction 507 for representing observation densities with the probability density functions; and an eighth instruction 508 for determining whether an event has occurred based on a sequence of semantic primitive features of the video signal.

In order to provide a context for the various aspects of the present invention, the following discussion is intended to provide a brief, general description of a suitable computing environment in which the various aspects of the present invention may be implemented. While the invention has been described above in the general context of computer-executable instructions of a computer program that runs on a computer, those skilled in the art will recognize that the invention also may be implemented in combination with other program modules.

Generally, program modules include routines, programs, components, data structures, etc. that perform particular tasks or implement particular abstract data types. Moreover, those skilled in the art will appreciate that the inventive methods may be practiced with other computer system configurations, including single-processor or multiprocessor computer systems, minicomputers, mainframe computers, as well as personal computers, hand-held computing devices, microprocessor-based or programmable consumer electronics, and the like. The illustrated aspects of the invention may also be practiced in distributed computing environments where tasks are performed by remote processing devices that are linked through a communications argument model. However, some, if not all aspects of the invention can be practiced on stand-alone computers. In a distributed computing environment, program modules may be located in both local and remote memory storage devices.

An exemplary system for implementing the various aspects of the invention includes a conventional server computer, including a processing unit, a system memory, and a system bus that couples various system components including the system memory to the processing unit. The processing unit may be any of various commercially available processors. Dual microprocessors and other multi-processor architectures also can be used as the processing unit. The system bus may be any of several types of bus structure including a memory bus or memory controller, a peripheral bus, and a local bus using any of a variety of conventional bus architectures. The system memory includes read only memory (ROM) and random access memory (RAM). A basic input/output system (BIOS), containing the basic routines that help to transfer information between elements within the server computer, such as during start-up, is stored in ROM.

The server computer further includes a hard disk drive, a magnetic disk drive, e.g., to read from or write to a removable disk, and an optical disk drive, e.g., for reading a CD-ROM disk or to read from or write to other optical media. The hard disk drive, magnetic disk drive, and optical disk drive are connected to the system bus by a hard disk drive interface, a magnetic disk drive interface, and an optical drive interface, respectively. The drives and their associated computer-readable media provide nonvolatile storage of data, data structures, computer-executable instructions, etc., for the server computer. Although the description of computer-readable media above refers to a hard disk, a removable magnetic disk and a CD, it should be appreciated by those skilled in the art that other types of media which are readable by a computer, such as magnetic cassettes, flash memory cards, digital video disks, Bernoulli cartridges, and the like, may also be used in the exemplary operating environment, and further that any such media may contain computer-executable instructions for performing the methods of the present invention.

A number of program modules may be stored in the drives and RAM, including an operating system, one or more application programs, other program modules, and program data. A user may enter commands and information into the server computer through a keyboard and a pointing device, such as a mouse. Other input devices (not shown) may include a microphone, a joystick, a game pad, a satellite dish, a scanner, or the like. These and other input devices are often connected to the processing unit through a serial port interface that is coupled to the system bus, but may be connected by other interfaces, such as a parallel port, a game port or a universal serial bus (USB). A monitor or other type of display device is also connected to the system bus via an interface, such as a video adapter. In addition to the monitor, computers typically include other peripheral output devices (not shown), such as speaker and printers.

The server computer may operate in a networked environment using logical connections to one or more remote computers, such as a remote client computer. The remote computer may be a workstation, a server computer, a router, a peer device or other common network node, and typically includes many or all of the elements described relative to the server computer. The logical connections include a local area network (LAN) and a wide area network (WAN). Such networking environments are commonplace in offices, enterprise-wide computer networks, intranets and the internet.

When used in a LAN networking environment, the server computer is connected to the local network through a network interface or adapter. When used in a WAN networking environment, the server computer typically includes a modem, or is connected to a communications server on the LAN, or has other means for establishing communications over the wide area network, such as the internet. The modem, which may be internal or external, is connected to the system bus via the serial port interface. In a networked environment, program modules depicted relative to the server computer, or portions thereof, may be stored in the remote memory storage device. It will be appreciated that the network connections shown are exemplary and other means of establishing a communications link between the computers may be used.

In accordance with the practices of persons skilled in the art of computer programming, the present invention has been described with reference to acts and symbolic representations of operations that are performed by a computer, such as the server computer, unless otherwise indicated. Such acts and operations are sometimes referred to as being computer-executed. It will be appreciated that the acts and symbolically represented operations include the manipulation by the processing unit of electrical signals representing data bits which causes a resulting transformation or reduction of the electrical signal representation, and the maintenance of data bits at memory locations in the memory system (including the system memory, hard drive, floppy disks, and CD-ROM) to thereby reconfigure or otherwise alter the computer system's operation, as well as other processing of signals. The memory locations where such data bits are maintained are physical locations that have particular electrical, magnetic, or optical properties corresponding to the data bits.

It will be understood that the above description of the present invention is susceptible to various modifications, changes and adaptations, and the same are intended to be comprehended within the meaning and range of equivalents of the appended claims. The presently disclosed embodiments are considered in all respects to be illustrative, and not restrictive. The scope of the invention is indicated by the appended claims, rather than the foregoing description, and all changes that come within the meaning and range of equivalence thereof are intended to be embraced therein.

Having described the invention, we claim:

1. A system for event recognition, said system comprising:
a server computer to generate from a video image;
a sequence of continuous vectors representing spatial-dynamic relationships of objects in a predetermined recognition area;
a sequence of binarized vectors derived from said sequence of continuous vectors by utilizing thresholds for determining binary values for each spatial-dynamic relationship, said sequence of binarized vectors indicating spatio-time dynamics of the objects;
a probabilistic state model utilizing said sequence of binarized vectors to indicate whether an event has occurred; and, output the event occurrence to a network.

2. The system as set forth in claim 1 wherein the objects include cargo, an airplane, and a forklift.

3. The system as set forth in claim 2 wherein information utilized to derive the spatio-dynamic relationships includes distances and relative speed between the objects and time indices for each of the objects.

4. The system as set forth in claim 3 wherein the distances are binarized by the thresholds for determining whether an object is "close" to another object.

5. The system as set forth in claim 4 further including event models created by users of said system defining some of semantic primitive features.

6. The system as set forth in claim 5 further including a Hidden Markov Model having predetermined states for modeling complete cycles of the objects.

7. The system as set forth in claim 6 wherein the predetermined states also model partial cycles of the objects.

8. The system as set forth in claim 1 wherein the thresholds are based on physical sizes of the objects and calibration information of cameras.

9. The system as set forth in claim 1 further including a finite probability of a high-level noise observation at a threshold boundary.

10. The system as set forth in claim 1 further including a Hidden Markov Model for enforcing temporal constraints.

11. A computer-readable memory embodied with a computer program product for recognizing events, said computer program product comprising:
a first instruction for representing objects and spatial-dynamic relationships of the objects by a continuous vector;
a second instruction for representing the spatial-dynamic relationships of objects with semantic primitive features;
a third instruction for converting the continuous vector to a binarized vector;
a fourth instruction for utilizing thresholds for determining binary values for each semantic primitive feature;
a fifth instruction for representing uncertainty of measurements of the semantic primitive features estimated from a video signal with probability density functions;
a sixth instruction for representing events with a state-space model;
a seventh instruction for representing observation densities with the probability density functions; and
an eighth instruction for determining whether an event has occurred based on a sequence of semantic primitive features of the video signal.

12. The computer program product as set forth in claim 11 further including a ninth instruction for avoiding modeling specific temporal trajectories of the objects.

13. The computer program product as set forth in claim 11 further including a ninth instruction for creating a model by a user for a predetermined event of interest.

14. The computer program product as set forth in claim 11 further including a ninth instruction for utilizing quantitative constraints in creating the binarized vector.

15. A system for recognizing events occurring between objects within a predetermined video recognition area, said system comprising:
a server computer to generate from a video image;
a sequence of continuous vectors representing spatial-dynamic relationships between the objects in the predetermined video recognition area;
a sequence of binarized vectors representing said sequence of continuous vectors by utilizing thresholds for determining binary values for each spatial-dynamic relationship,
said sequence of binarized vectors and a probabilistic state-space model being used to indicate whether an event has occurred; and, output the event occurrence to a network.

16. The system as set forth in claim 15 wherein the event is loading of an item of cargo.

17. The system as set forth in claim 15 wherein the event is unloading of an item of cargo from an airplane.

18. The system as set forth in claim 15 wherein the thresholds are based physical sizes of the objects.

19. The system as set forth in claim 15 further including an event model utilizing semantic primitive features of the objects.

* * * * *